United States Patent [19]

Keuter et al.

[11] Patent Number: 4,694,780
[45] Date of Patent: Sep. 22, 1987

[54] ANIMAL ACTUATED FEEDER

[76] Inventors: Dale H. Keuter, 1026 Sherman Ave.; Karl A. Keuter, R. R. #1, P.O. Box 257B, both of Manchester, Iowa 52057

[21] Appl. No.: 829,207

[22] Filed: Feb. 14, 1986

[51] Int. Cl.4 .............................................. A01K 1/10
[52] U.S. Cl. ................................................... 119/53.5
[58] Field of Search .................................. 119/54, 53.5

[56] References Cited

U.S. PATENT DOCUMENTS

| | | | |
|---|---|---|---|
| 484,442 | 10/1892 | Magoon | 119/53.5 |
| 961,779 | 6/1910 | Kellum | 119/54 |
| 1,036,762 | 8/1912 | Williams | 119/53.5 |
| 1,285,348 | 11/1918 | Page | 119/54 |

Primary Examiner—John J. Wilson
Assistant Examiner—Adriene J. Lepiane
Attorney, Agent, or Firm—James C. Nemmers

[57] ABSTRACT

An animal-actuated feeding apparatus of the type that includes a feeding trough located beneath the discharge opening of a hopper containing the feed. The feed flows by gravity from the hopper through the discharge opening into the trough, but the feed flow is controlled by an animal-actuated dispensing mechanism. This mechanism includes a cradle-wiper assembly in which the cradle is rocked by the animal moving a paddle that extends into the trough area. Rocking of the cradle also agitates the feed stored in the hopper to prevent bridging across the hopper discharge opening. Manually adjustable means is also provided to control feed flow rate.

6 Claims, 3 Drawing Figures

ANIMAL ACTUATED FEEDER

BACKGROUND OF THE INVENTION

This invention relates to an animal feeder of the type in which the animal feeds upon demand by controlling the feed delivered to the feed area.

The prior art reveals numerous designs of animal feeders of the animal-actuated type. The conventional feeder of this type has a storage hopper for storing a quantity of feed, the hopper being located above one or more feeding stations. Flow of the feed from the hopper to the feeding station is controlled by the animal through a mechanism positioned between the discharge opening of the hopper and the feeding station. Generally, there is an actuator that extends down into the feeding station, and when the acturator is moved by the animal, feed will drop by force of gravity through the discharge opening into the feeding station. Often, feeders of this type are also provided with a source of water that is supplied, usually on demand, to the feed station and when mixed with a feed forms a slurry. However, normally, the water supply system is independent of the mechanism supplying the dry feed, and the feed and water systems are also independently actuated by the animal.

Prior art feeders of this type have been plagued with problems of plugging at the discharge opening of the hopper because the dry feed will bridge the opening. Also, depending upon the coarseness of the feed, the feed mechanism may meter too much or not enough feed each time the animal actuates the mechanism. Attempts in the prior art at providing adjustability to compensate for the coarseness of the feed are sometimes complex and frequently do not work properly. Also, they require adjustment each time the type of feed is changed to a feed of different texture. In addition, prior art feeders of this type do not have a satisfactory adjustment that enables easy regulation of the feed flow rate.

There is therefore a need for an improved animal-actuated type feeding apparatus that will be substantially foolproof, easy to maintain and adjust and relatively inexpensive to manufacture.

SUMMARY OF THE INVENTION

In a feeder constructed according to the principles of the invention, feed passing through the discharge opening of the hopper drops into a cradle assembly that is mounted for pivotal movement to provide a rocking motion to the cradle. A stationary wiper plate extends along the bottom surface of the cradle so that when the cradle is rocked, feed contained in the cradle will be forced out the open side of the cradle. The cradle is rocked by connection to an actuator in a manner such that movement of the actuator by the animal will cause the cradle to rock. Positive control of the feed flow rate is provided by limiting the movement of the agitator by the animal, and easy adjustability, and thus regulation of the flow rate, is provided.

DESCRIPTION OF THE PREFERRED EMBODIMENT OF THE INVENTION

Figure 1:
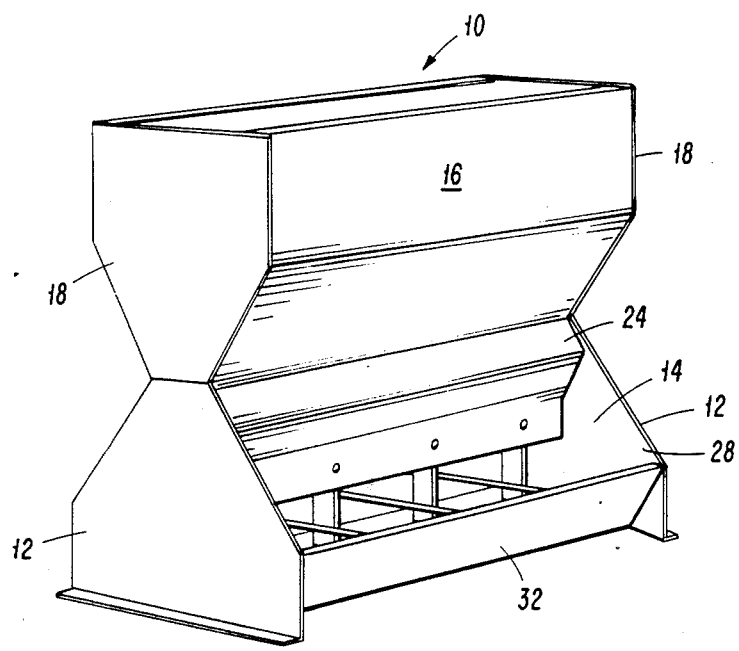
FIG. 1 is a perspective view of a feeder of the type to which the invention relates.

The feeder illustrated in the drawings includes a feed storage means or hopper 10 that is supported by vertical supports 12 above a plurality of feeding stations 14. The hopper 10 has vertically extending upper side walls 16 that are parallel and joined to end walls 18 to form a rectangular shaped enclosure open at the top. As shown end walls 18 are a continuation of the vertical supports 12. The lower ends of the side walls 16 slope inwardly toward each other, and the lower edges 20 define a longitudinally extending discharge opening 22. Covering the discharge opening 22 is a plenum chamber 24 that preferably is of a shape suitable to accommodate the feed control mechanism described hereinafter. As shown in the drawings, the lower open end of the plenum chamber defines a feed discharge opening 26 through which the dry feed passes into the feeding stations 14.

Feeding stations 14 are defined by the inside surfaces 28 of the vertical supports 12, the floor 30 of the feeder, and upwardly and outwardly extending lower side walls 32. If desired, dividers 34 extend between the lower side walls 32 so as to define the separate feeding stations 14.

Figure 2:
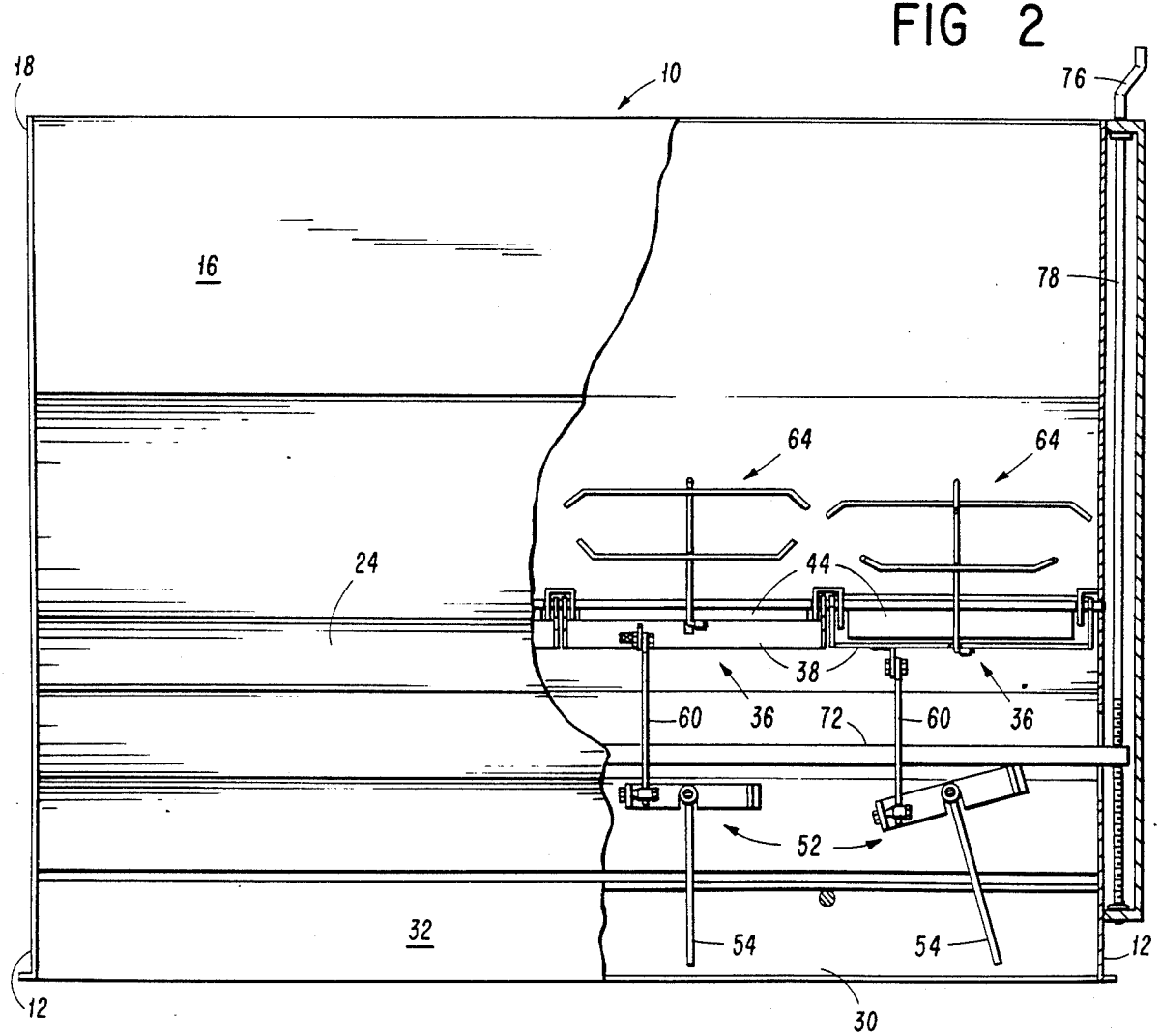
FIG. 2 is a side elevational view, partly in section, of the feeder of FIG. 1.
Figure 3:
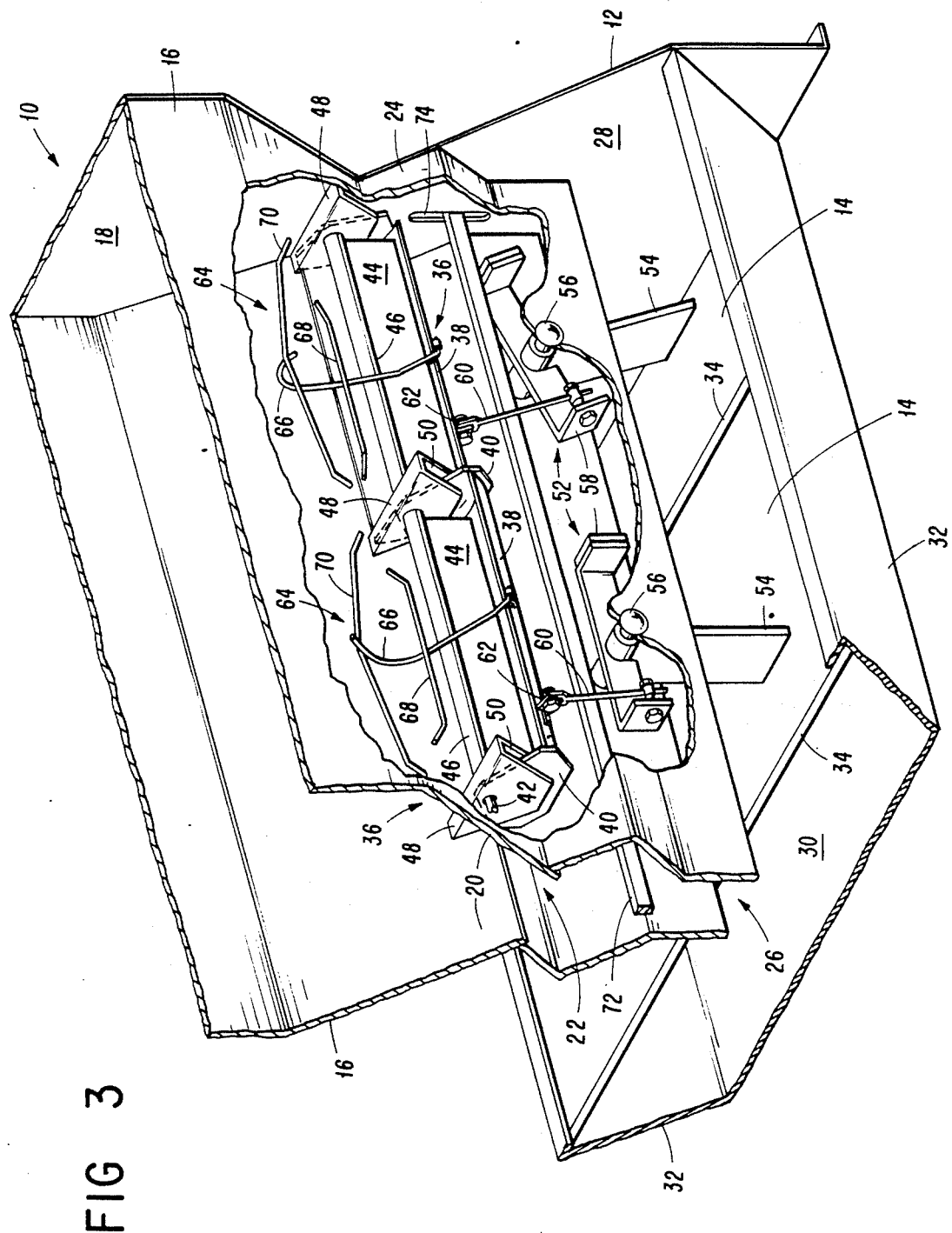
FIG. 3 is a perspective view of a feeder constructed according to the principles of the invention with portions broken away to show the operating mechanism.

As best seen in FIGS. 2 and 3, positioned above each of the feeding stations 14 is a cradle assembly indicated generally by the reference numeral 36. Each assembly 36 includes an upwardly curved bottom wall 38 supported by end walls 40 which are in turn pivotally mounted on shaft 42 that extends between end walls 18 of the hopper 10. Each cradle assembly 36 also includes stationary wipers 44 which are vertically extending plates that have tubular, longitudinally extending upper portions 46 that are secured to supports 48 that are in turn welded or otherwise secured to the inward or sloping portions of the upper side walls 16 of hopper 10. As best seen in FIG. 3, the supports 48 are provided with slots 50 into which the end walls 40 extend for connection to the shaft 42 which extends through the tubular upper portions 46 of the wipers 44. With the foregoing described assembly, it will be evident that the cradles 36 are free to rock back and forth in an arcuate path that is limited by engagement of the end walls 40 with the supports 48. It will also be evident that as a cradle 36 rocks, the wiper 44 will remain stationary thus providing for relative movement between the wiper 44 and the bottom wall 38 of the cradle 36.

To produce the animal-actuated rocking motion in the cradle assemblies 36, each cradle assembly 36 is connected to an actuator assembly indicated generally by the reference numeral 52. Each actuator assembly includes a paddle 54 that extends downwardly into the feeding station 14, the upper end of the paddle 54 being mounted for swingable movement about pivot 56 that extends transversely between the lower side walls 32. Affixed to so as to be moveable with each paddle 54 as it swings, are in a pair of arms 58 that extend transversely to the pivot 56. The outer end of one of the arms 58 is connected by an operating rod 60 to the bottom wall 38 of a cradle assembly 36, the pivotal connection 62 preferably being made near the upper edge of the bottom wall 38 as shown in FIG. 3.

From the foregoing description, it will be evident that as the paddle 54 is pivoted, arms 58 will swing upwardly and downwardly, and through operating rod 60 the cradle 36 will be pulled downwardly or moved upwardly. Thus, if an animal, such as a hog, swings the lower end of the paddle 54 to the right (see FIGS. 2 and 3), arm 58 will cause the rod 60 to pull the front edge of the cradle 36 downwardly. When the cradle 36 is thus moved downwardly, any material, such as feed, that has been deposited in the cradle 36, will be forced off the front edge of the cradle by the wiper 44, relative movement having thus been produced between wiper 44 and the bottom wall 38 of the cradle 36. Similarly, if the animal should move the paddle 54 to the left, the operating rod 60 will be forced upwardly, thus moving the front edge of the cradle 36 upwardly and forcing the material deposited in the cradle 36 off the rear edge of the bottom wall 38. In either case, the feed deposited in the cradle from the hopper 10 will be swept off and by gravity fall into the feeding station 14 beneath it.

Since dry granular type feed can tend to bridge across an opening at the bottom of a hopper, the feed contained in the hopper 10 is preferably frequently agitated. We accomplish this by providing an agitator 64, pivotally attached to the front (or rear) edge of the bottom wall 38 of each cradle assembly 36. Agitators 64 can be of any design that will produce stirring or agitation of the feed stored in the hopper 10, and the agitator 64 shown in the drawings consists of an upwardly curved member 66 and two cross members 68 and 70 affixed to it. The upperly curved member 66 will rest on the tubular portion 46 of the adjacent wiper 44 thus supporting it.

One of the additional features of the invention that solves a problem of prior art feeders is to provide for positive regulation of the feed flow rate in a simple manner. With the feed dispensing mechanism of the invention, this can be easily accomplished by providing a longitudinally extending adjustment bar 72 that is moveable through a limited vertical distance in guide slots 74 (FIG. 3) formed in the vertical supports 12 at each end of the feeder. As best seen in FIG. 3, the adjustment bar 72 extends through the central portion of the feeder and is positioned between the cradle assemblies 36 and the respective actuator assemblies 52. In this position, the adjustment bar will be engaged by one of the arms 58 of the actuator assembly 52 when the paddle 54 is pivoted by the animal. The adjustment bar 72 thus provides a stop to limit movement of the paddle 54 by the animal, and in so limiting movement of the paddle 54, movement of the operating rod 60 is proportionally limited and rocking of the cradle assembly 36 is limited. Thus, by positioning of the adjustment bar 72, the feed control rate can be controlled. To provide for changing position of the adjustment bar 72, FIG. 2 illustrates a crank 76 connected to a vertically extending rod 78 that is threaded at its lower end through the end of the adjustment bar 72 which extends through the guide slot 74. By thus turning the crank 76, the adjustment bar 72 can be raised and lowered at each of its ends. Of course, each end of adjustment bar 72 would preferably be raised and lowered about the same amount, although if different feed control rates were desired in each of the feeding stations 14 in a multiple feeder, this could be provided by raising one end of the adjustment bar 72 more than the other end. Although not shown in FIGS. 1 and 3, the crank 72 and the associated connection with the adjustment bar 72 would be provided by mounting the crank 76 and the rod 78 outside of the end walls 18 of the hopper 10 with the crank 76 extending above the top of the hopper 10 as shown in FIG. 2.

Although the invention has been illustrated only in connection with a dry feeder, it will be evident to those skilled in the art that the principles of the invention are equally applicable to a combination dry feed and water type feeder. Feeders of this type are well known, and have a separate system provided for supplying water into the feed stations 14. The water system is independent of the dry feed system, and conventionally has a separate animal-actuator to control the water supply. Because of the simplicity of the apparatus of the invention and because it requires a minimum amount of room and moving parts in a dry feeder, the principles of the invention can be used very easily with the combination dry feed and water type feeders that are well known to those in the field.

Although we have shown a preferred embodiment of the invention, it will be evident to those skilled in the art that various revisions and modifications can be made to the preferred embodiment disclosed herein without departing from the spirit and scope of the invention. For example, the mechanical connection between the cradle assembly 36 and the actuator assembly 52 could be a sprocket and chain connection with the sprocket mounted on the shaft 42 and connected to the actuator assembly 52 by a chain. Similarly, a belt and pulley arrangement could be used. It is our intention however that all such revisions and modifications and equivalent constructions will be included within the scope of the following claims.

What is claimed is:

1. An animal-actuated feeder comprising means defining a feeding area accessible to the animals; feed storage means having a feed discharge opening disposed over the feeding area; feed dispensing means located between the feeding area and the feed storage means to receive feed from the storage means and dispense the feed into the feeding area; the feed dispensing means including a cradle positioned beneath the discharge opening of the feed storage means to normally prevent the gravity-flow of feed from the storage means into the feeding area; the cradle having a bottom and ends and upturned sides to hold feed in the cradle; the feed dispensing means also including a wiper engageable with the bottom of the cradle and moveable relative thereto to move the feed off the cradle whenever relative movement between the cradle and wiper occurs; and actuating means for providing movement of the cradle relative to the wiper, said actuating means including a member extending within the feeding area so as to be moveable by an animal to produce movement of the cradle; and an agitator connected to the cradle and moveable therewith, said agitator extending upwardly into the feed storage means so as to prevent bridging of the stored feed over the feed discharge opening.

2. An animal-actuated feeder comprising means defining a feeder area accessible to the animal; feed storage means having a feed discharge opening disposed over the feeding area; feed dispensing means located between the feeding area and the feed storage means to receive feed from the storage means and dispense the feed into the feeding area; the feed dispensing means including a cradle positioned beneath the discharge opening of the feed storage means to normally prevent the gravity-flow of feed from the storage means into the feeding area, the cradle being pivotally mounted on a horizontal axis for limited pivotal movement; the feed dispensing means also including a wiper positioned inside of the cradle in a fixed position so as to move the feed out of the cradle as the cradle pivots; a member extending within the feeding area so as to be moveable by an animal to produce pivotal movement of the cradle whenever the member is moved by an animal; and actuating means operatively connecting the cradle with the animal-actuated member.

3. The animal-actuated feeder of claim 2 in which the member extending within the feeding area and moveable by an animal is pivotally mounted at its upper end about a horizontal axis, an arm extends outwardly from said member and is pivotally moveable therewith, and an operating rod connects the arm with the cradle.

4. The animal-actuated feeder of claim 3 in which the animal actuated member normally extends vertically downwardly from its pivot mounting, and arms extend outwardly in opposite directions and generally in a horizontal plane when the animal-actuated member is at rest, one of said arms being operatively connected to the cradle.

5. The animal-actuated feeder of claim 4 in which a feed control member is positioned to extend generally horizontally above the arms and in the path of the arms as they pivot, said feed control member being engageable by one of said arms as the animal-actuated member pivots, and the feed control member being mounted so that its position can be selectively varied upwardly and downwardly.

6. The animal-actuated feeder of claim 5 in which an agitator is connected to the cradle and is moveable therewith when it pivots, said agitator extending upwardly into the feed contained in the feed storage means so as to prevent bridging of the stored feed.

* * * * *